(12) United States Patent
Neidhardt et al.

(10) Patent No.: US 11,811,074 B2
(45) Date of Patent: Nov. 7, 2023

(54) FUEL CELL

(71) Applicant: Robert Bosch GmbH, Stuttgart (DE)

(72) Inventors: Andre Neidhardt, Ludwigsburg (DE); Jan Hendrik Ohs, Renningen (DE); Stefan Grosse, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 17/261,075

(22) PCT Filed: Jul. 16, 2019

(86) PCT No.: PCT/EP2019/069124
§ 371 (c)(1),
(2) Date: Jan. 18, 2021

(87) PCT Pub. No.: WO2020/016228
PCT Pub. Date: Jan. 23, 2020

(65) Prior Publication Data
US 2021/0320306 A1    Oct. 14, 2021

(30) Foreign Application Priority Data
Jul. 18, 2018   (DE) .................. 10 2018 211 916.3

(51) Int. Cl.
*H01M 4/92*      (2006.01)
*H01M 8/1007*   (2016.01)
*H01M 4/88*      (2006.01)

(52) U.S. Cl.
CPC ......... *H01M 4/926* (2013.01); *H01M 4/8825* (2013.01); *H01M 8/1007* (2016.02)

(58) Field of Classification Search
CPC ... H01M 4/926; H01M 4/8825; H01M 8/1007
See application file for complete search history.

(56) References Cited

FOREIGN PATENT DOCUMENTS

| | | |
|---|---|---|
| DE | 10013323 A1 | 9/2001 |
| DE | 102009001153 | 2/2010 |
| DE | 102013020876 A1 | 6/2014 |
| DE | 102016111224 A1 | 8/2017 |
| JP | 2005093172 | 4/2005 |
| JP | 2018006300 | 1/2018 |
| WO | 2004040673 A2 | 5/2004 |

OTHER PUBLICATIONS

International Search Report for Application No. PCT/EP2019/069124 dated Sep. 10, 2019 (English Translation, 3 pages).

*Primary Examiner* — Sarah A. Slifka
(74) *Attorney, Agent, or Firm* — Michael Best & Friedrich LLP

(57) ABSTRACT

The invention relates to a fuel cell (110) comprising two gas diffusion layers (70), two electrode elements (10, 10') and a membrane element (30). The membrane element (30) is arranged between the two gas diffusion layers (70), each electrode element (10, 10') being embedded between a gas diffusion layer (70) and the membrane element (30). The membrane element (30) is in the form of an amorphous carbon layer.

11 Claims, 3 Drawing Sheets

Section III

Section IV

FUEL CELL

BACKGROUND OF THE INVENTION

Fuel cells are known from the prior art, for example from the first publication DE 10 2009 001 153 A1. The known fuel cell comprises two gas diffusion layers, two electrode elements and a membrane element. The membrane element is arranged between the two gas diffusion layers with interpositioning of an electrode element in each case. An oxidant, usually ambient air, is supplied to the fuel cell via a feed conduit and a gaseous fuel, usually hydrogen, is supplied via a fuel conduit. An electrochemical reaction of the fuel with the oxidant then occurs in the fuel cell with participation of a catalyst. The membrane element has for this purpose to be ion-conducting, preferably so that the cations of the fuel can diffuse through the membrane element. Polymers are usually employed as membrane element. The ionic conductivity of these polymers increases with the content of liquid water therein. For this reason, the polymers must be exposed only to operating temperatures of less than 100° C., so that the liquid water does not vaporize.

SUMMARY OF THE INVENTION

The fuel cell of the invention, on the other hand, has significantly increased permissible operation temperatures, namely up to at least 350° C. This enables the thermal management of the fuel cell to be considerably simplified and the power density of the fuel cell to be increased.

For this purpose, the fuel cell comprises two gas diffusion layers, two electrode elements and a membrane element. The membrane element is arranged between the two gas diffusion layers, with in each case an electrode element being embedded between a gas diffusion layer and the membrane element. The membrane element is configured as an amorphous carbon layer.

The amorphous carbon layer is gastight, electrically insulating, proton-conducting and very heat resistant. The membrane element of the fuel cell is thus also suitable for comparatively high temperatures, preferably up to 350° C. Cooling of the fuel cell can thus be made simpler, the layer thickness of the membrane element can be reduced, and the power density of the fuel cell accordingly increases. The membrane element also has a proton conductivity at a significantly lower moisture content than is usual; this is a great advantage of the amorphous carbon layer.

Accordingly, no moistening of the membrane element is necessary in a method for operating the fuel cell. In the method, a fuel, preferably hydrogen, is provided at one of the two gas diffusion layers and an oxidant, preferably oxygen, is provided at the other of the two gas diffusion layers. Neither the fuel nor the oxidant are enriched with moisture since the membrane element is configured as amorphous carbon layer and is thus proton-conducting even without external moistening. For this reason, a moistening device can be omitted in a fuel cell system comprising the fuel cell of the invention.

In preferred embodiments, the membrane element is configured as hydrogen-containing amorphous carbon layer or else as tetrahedral hydrogen-containing amorphous carbon layer. The electrical resistance of the membrane element is particularly high as a result.

In an alternative advantageous embodiment, the membrane element is configured as tetrahedral hydrogen-free amorphous carbon layer. The proton conductivity of the membrane element is particularly high as a result.

The amorphous carbon layer is advantageously doped. The doping, preferably with semimetals, alkali metals or nonmetals, improves the proton conductivity and the electrical insulation of the membrane element further.

In advantageous further developments, a catalyst structure is arranged on at least one of the electrode elements. The catalyst structure, preferably platinum, is advantageously embedded in the electrode element; together they form the electrode. The catalyst structure serves to ionize the fuel and/or the oxidant for the electrochemical reaction in the fuel cell. The connection between catalyst structure and membrane element is assisted when the membrane element is configured as amorphous carbon layer, especially when the catalyst structure is added as doping substance during a coating process. For this purpose, the catalyst structure is preferably added as doping substance to the membrane element. The catalyst, preferably platinum, or the catalyst structure can preferably be integrated into the membrane element by means of a coating process. For this purpose, the catalyst structure is advantageously firstly applied to a gas diffusion layer and coating with the membrane element is subsequently carried out, with both coating processes being able to occur in parallel in a transition phase.

In advantageous embodiments, a gaseous fuel flows to the catalyst structure, preferably via one of the gas diffusion layers, during an electrochemical reaction. In the electrochemical reaction, the fuel reacts with an oxidant, and an electric current flows through the electrode elements. The gas diffusion layer is arranged on the electrode element on the side of the electrode element facing away from the membrane element, or surrounds the electrode element.

In advantageous processes for producing a fuel cell as described above, the electrode element with the catalyst structure is first applied to the gas diffusion layer. Subsequently, the membrane element is applied on top of the electrode element in a coating process. The electrode element with the catalyst structure is thus positioned between gas diffusion layer and membrane element. As a result of the coating process, the connection between gas diffusion layer, electrode element, catalyst structure and membrane element is particularly good. Both the strength and the proton conduction are thus optimized. Preference is given to an electrode element with a catalyst structure subsequently being applied again to the other side of the membrane element. The production process for the fuel cell has short cycle times and low costs as a result.

In another advantageous process, the catalyst structure is applied to the gas diffusion layer at least partly parallel to the membrane element. The process comprises the following process steps for this purpose: firstly a coating process for the membrane element onto the gas diffusion layer is commenced. A doping process for the electrode element with the catalyst structure is carried out in parallel for at least part of the time. This is particularly advantageous for the formation of the three-phase boundary at which the fuel or the oxidant, the membrane element and the electrode element with the catalyst structure come together. Before the coating process is complete, a further doping process for the opposite catalyst structure is preferably commenced on the other side of the membrane element. In this way a catalyst structure is applied to both sides of the membrane element, with the two catalyst structures being able to be different. To complete the process, the second gas diffusion layer can then be applied. The production process for the fuel cell has short cycle times and low costs as a result.

In the production processes, a pickling process for activating the gas diffusion layer is advantageously carried out beforehand. The pickling process cleans and activates the surface and thus allows effective docking of the membrane element with the gas diffusion layer.

The above-described fuel cells can preferably be used for a fuel cell system for powering a motor vehicle.

BRIEF DESCRIPTION OF THE DRAWINGS

Further optional details and features of the invention may be derived from the following description of preferred working examples, with reference being made to the figures.

The figures show.

DETAILED DESCRIPTION

Figure 1:
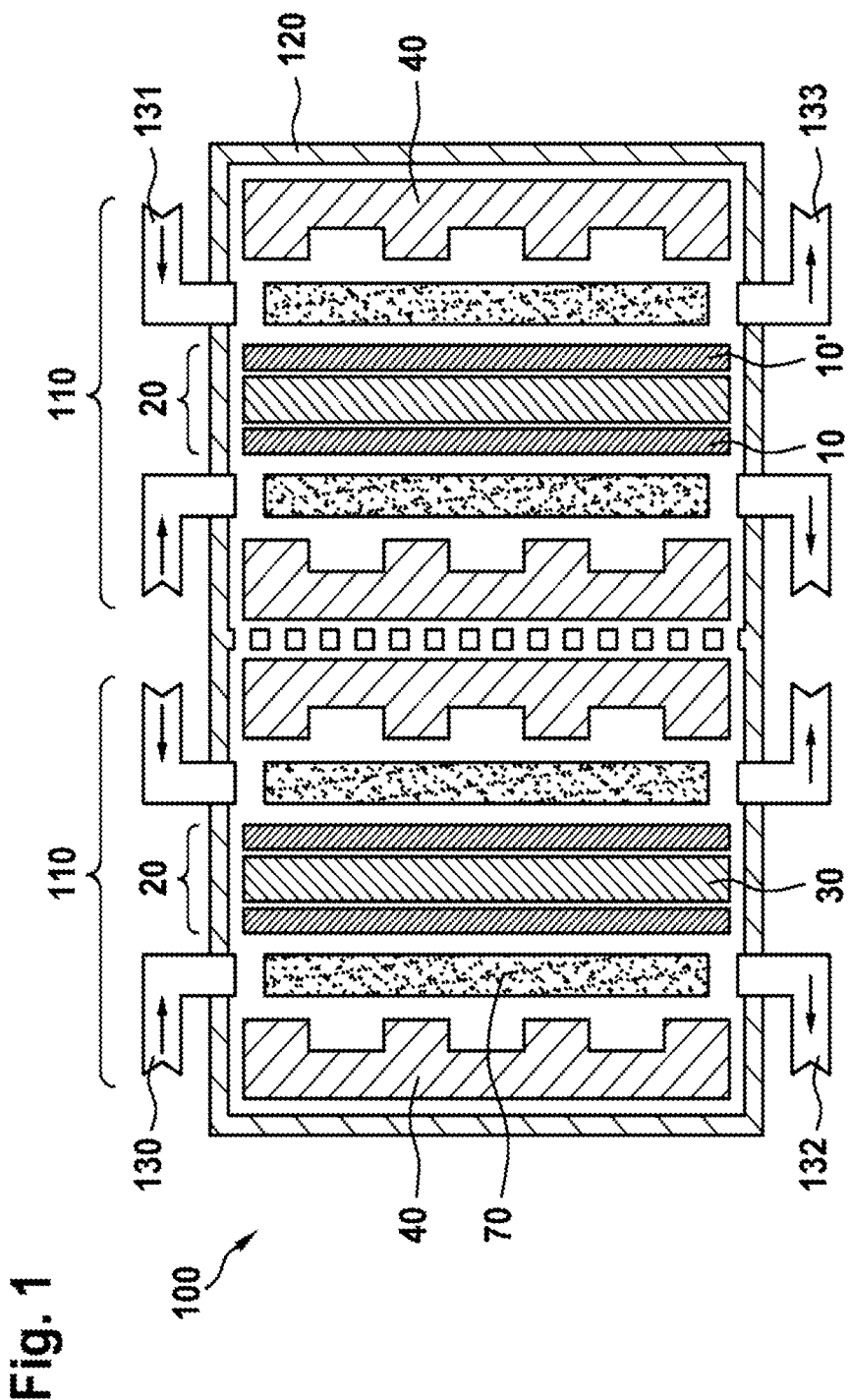
FIG. 1 a schematic depiction of a fuel cell system known from the prior art, with only the essential regions being shown.

FIG. 1 depicts a known fuel cell system 100 from DE 10 2009 001 153 A1, which here comprises two fuel cells 110, with only the essential regions being shown. These fuel cells 110 are arranged adjoining one another in a housing 120. Each of the fuel cells 110 has two electrode elements 10, 10' which are arranged on a membrane element 30. An electric current is generated in an electrochemical reaction by supplying the electrode elements 10, 10' with two different fuels, also referred to as reactants. The two reactants are frequently provided in the form of different fluids. An example of the two corresponding electrode reactions are the following:

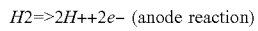

$H2 \Rightarrow 2H+ +2e-$ (anode reaction)

$2H+ +2e- +\frac{1}{2}O2 \Rightarrow H2O$ (cathode reaction).

The electric power generated can be consumed in a load element. The reactant oxygen can be supplied in the form of ambient air to the fuel cell 110. Linking of the various fuel cells 110 in series by means of a conduction element makes it possible to achieve a high voltage which can be made available to the load element, for instance an electric motor. In order to achieve uniform distribution of the reactants on the electrode elements 10, 10', the fuel cell 110 has a flow field plate 40. The two starting materials flow via the inflow elements 130, 131 into the interior of the fuel cell. Here, a fuel such as hydrogen is fed to the fuel cell 110 through the inflow element 130. The oxidant flows through the inflow element 131 into the fuel cell. In order to achieve uniform distribution of the fuel over the full area of the electrode element 10, 10', two flow field plates 40 are arranged in the fuel cell 110. A space is formed between the electrode elements 10, 10' and the respective flow field plate 40, and a gas diffusion layer 70 is arranged in this. This gas diffusion layer 70 generally consists of a pressed carbon nonwoven. The membrane element 30 together with the two adjoining electrode elements 10, 10' forms a membrane-electrode assembly 20, which will be discussed in more detail below.

Figure 2:
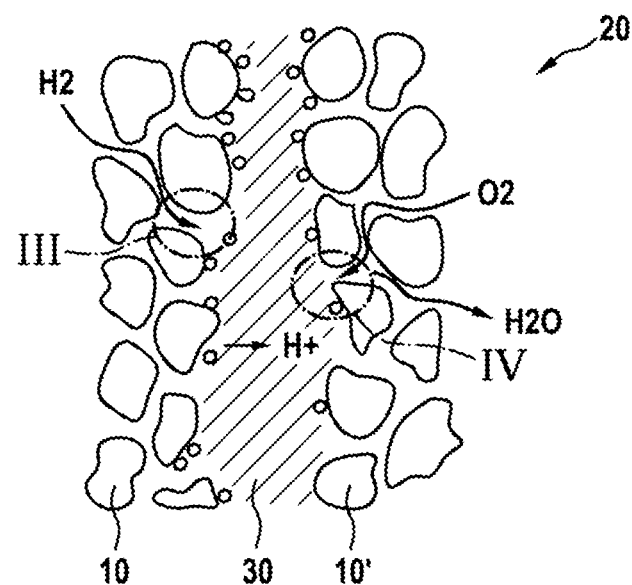
FIG. 2 a section of a membrane-electrode assembly known from the prior art, with only the essential regions being shown.

FIG. 2 shows a section of a membrane-electrode assembly 20 as is known from the prior art. The membrane-electrode assembly 20 comprises the membrane element 30 and an electrode element 10, 10' adjoining each of the two faces. In the depiction of FIG. 2, the anode side with the inlet for fuel, in this case hydrogen, is shown at left and the cathode side with the inlet for oxidant, in this case oxygen, shown at right. However, the hydrogen is oxidized, namely releases electrons, at the electrode element 10 of the anode side only when a catalyst is used. An analogous situation applies to the reduction of the oxygen on the cathode side.

Figure 3:
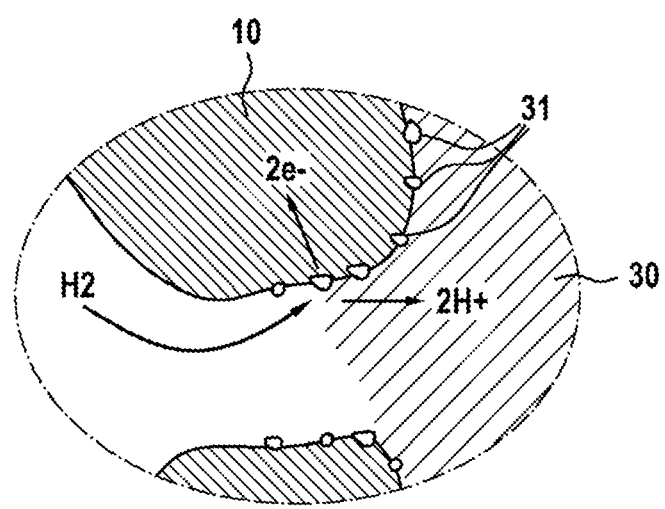
FIG. 3 the section III of FIG. 2.

To illustrate this, FIG. 3 shows the section III of FIG. 2. In the region of the connection between the electrode element 10 and the membrane element 30, there is a catalyst structure 31 which preferably consists of platinum and has a grain structure. The catalyst structure 31 has to be arranged in such a way that the fuel can flow or diffuse directly against it and at the same time the ionized fuel can flow/diffuse into the membrane element 30 and the electrons can be conducted away via the electrode element 10. A three-phase boundary at which the fuel through the gas diffusion layer 70, the electrode element 10 with the catalyst structure 31 for electrode conduction and the membrane element 30 as ionic phase come together thus has to be formed at the gas diffusion layer 70 on the membrane-electrode assembly 20. The catalyst structure 31 is preferably composed of platinum and with the electrode element 10, which is preferably composed of carbon, forms the electrode.

An analogous three-phase boundary is formed on the cathode side. This can be seen in FIG. 4, which shows the section IV of FIG. 2. The fuel ions, in the present case hydrogen cations, diffusing through the membrane element 30 react with the oxygen and the electrons brought from the anode side via the electrode elements 10, 10', with acceleration by the catalyst of the catalyst structure 31. In the present example, water is formed as reaction product as a result.

According to the invention, the membrane element 30 is configured as DLC (Diamond-like Carbon) layer, i.e. as amorphous carbon layer. Due to the amorphous carbon layer, the membrane-electrode assembly 20 can be subjected to significantly higher operating temperatures, advantageously up to 350° C., than has been the case when using conventional materials for the membrane element 30. This is associated with a significantly simpler water/temperature management for the fuel cell 110 and also the potential for a higher efficiency of the fuel cell 110 or the fuel cell system 100.

The amorphous carbon layer is gastight, electrically insulating and proton-conducting, and thus differs significantly from a graphite layer and is therefore very well-suited as membrane element 30. The amorphous carbon layer requires only little or even no moisture for its proton conductivity, so that it is resistant to much higher temperatures. The increased heat resistance also allows a reduced outlay for cooling, which makes denser packing of the fuel cells and thus an increased power density possible.

Furthermore, the membrane-electrode assembly 20 having a membrane element 30 composed of an amorphous carbon layer offers manufacturing advantages:

As a result of the coating technique, the catalysts or the catalyst structure 31 can be joined more simply to the membrane element 30 and to the electrode elements 10, 10' or to a support material, which preferably consists of carbon, in order to form the electrode. As an alternative, therefore, an efficiency of the fuel cell system 100 comparable with a similar system from the prior art can be achieved using less catalyst material, which is very expensive.

In preferred manufacturing processes, the membrane element 30 is applied as DLC layer by means of coating technology to the gas diffusion layer 70, with insertion of the electrode element 10, 10' in between. The composition of the DLC layer (in particular the content of sp2 and sp3 bonds and hydrogen bonds) can be varied/set by means of process parameters.

In further developments, the amorphous carbon layer is also able to be doped with different dopants or doping substances and thus able to be modified in terms of its properties, including in respect of the proton conductivity. Thus, the catalyst structure 31 can also advantageously be embedded as dopant in the DLC layer or in the membrane element 30.

All amorphous carbon layers indicated in VDI 2840, for example amorphous carbon layers configured as a-C:H or ta-C, where a-C:H denotes a hydrogen-containing amorphous carbon layer and ta-C denotes a tetrahedral hydrogen-free amorphous carbon layer, are suitable as membrane element 30.

To achieve good bonding of the amorphous carbon layer or of the membrane element 30 to the gas diffusion layer 70, this bonding is advantageously preceded by a pickling process which cleans and activates the surface and thus allows effective docking of the membrane element 30 with the gas diffusion layer 70.

Figure 4:
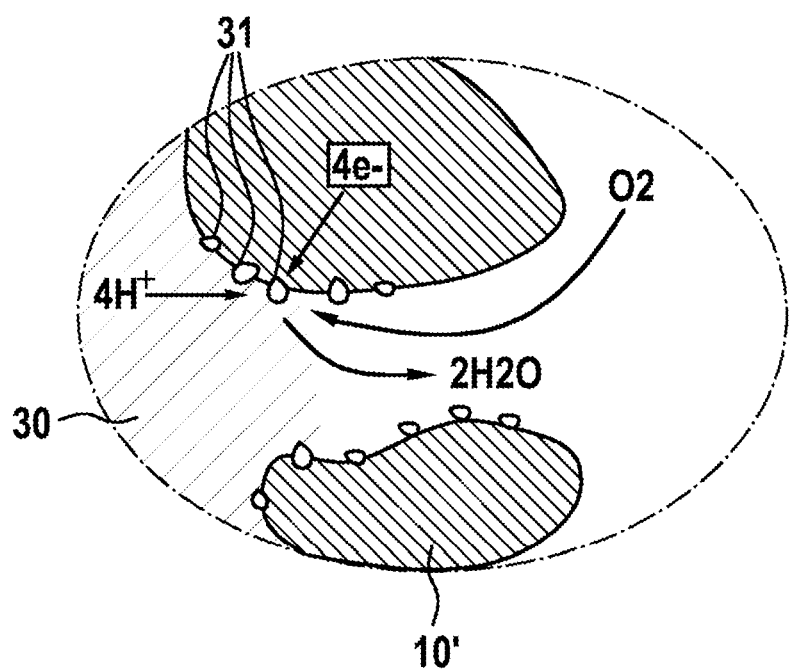
FIG. 4 the section IV of FIG. 2.

The membrane element 30 can optionally be provided on both sides with a catalyst structure (for example Pt, Rh by means of PVD coating or reactive PVD coating; PVD=Physical Vapor Deposition). Here, a distinction is made between two preferred variants:

The catalyst structures 31 are arranged on the outside of the membrane element 30 and are in direct contact with the media surrounding the membrane element 30, as shown in FIGS. 2 to 4. For this purpose, the catalyst layer or the catalyst structure 31 is firstly applied to the gas diffusion layer 70 at the beginning of the coating process and only then is the membrane element 30 applied as amorphous carbon layer. Subsequently, a catalyst structure 31 is again applied to the other side of the membrane element 30 in order to achieve a presence of catalyst on both sides of the membrane element 30.

The catalyst structure 31 is minimally embedded in the membrane element 30. The reaction then occurs not more than a few nanometers through the membrane element 30. For this purpose, the DLC coating process is firstly commenced on the gas diffusion layer 70 and, depending on the embedding depth, the doping process for the catalyst structure 31 is carried out in parallel. In an analogous way, a parallel doping or coating process for the second catalyst structure 31 can again be carried out shortly before the end of the DLC coating process but on the opposite side of the membrane element 70.

The invention claimed is:

1. A fuel cell (110) comprising two gas diffusion layers (70), two electrode elements (10, 10') and a membrane element (30), wherein the membrane element (30) is arranged between the two gas diffusion layers (70), with a respective one of the two electrode elements (10, 10') being embedded between one of the two gas diffusion layers (70) and the membrane element (30), characterized in that the membrane element (30) is configured as an amorphous carbon layer.

2. The fuel cell (110) as claimed in claim 1, characterized in that the membrane element (30) is configured as a hydrogen-containing amorphous carbon layer.

3. The fuel cell (110) as claimed in claim 1, characterized in that the membrane element (30) is configured as a tetrahedral hydrogen-free amorphous carbon layer.

4. The fuel cell (110) as claimed in claim 1, characterized in that the amorphous carbon layer has been doped.

5. The fuel cell (110) as claimed in claim 1, characterized in that a catalyst structure (31) is arranged on at least one of the electrode elements (10, 10').

6. The fuel cell (110) as claimed in claim 5, characterized in that the catalyst structure (31) has been added as a doping substance to the membrane element (30).

7. The fuel cell (110) as claimed in claim 5, characterized in that a gaseous fuel flows against the catalyst structure (31) during an electrochemical reaction.

8. A process for producing a fuel cell (110) as claimed in claim 5, characterized by the following process steps:
   a first of the two electrode elements (10, 10') with the catalyst structure (31) is firstly applied to the gas diffusion layer (70),
   the membrane element (30) is subsequently applied on top of the electrode element (10, 10'),
   a second of the two electrode elements (10, 10') with the catalyst structure (31) is applied to the other side of the membrane element (30).

9. A process for producing a fuel cell (110) as claimed in claim 5, characterized by the following process steps:
   a coating process for the membrane element (30) onto the gas diffusion layer (70) is firstly commenced,
   a doping process for a first of the two electrode elements (10, 10') with the catalyst structure (31) is carried out in parallel for at least part of the time,
   a further doping process for the second of the two electrode elements (10, 10') with the catalyst structure (31) is started on the other side of the membrane element (30) before completion of the coating process.

10. The process as claimed in claim 8, wherein a pickling process for activating the gas diffusion layer (70) is carried out.

11. A method for operating a fuel cell (110) as claimed in claim 1, characterized by the following method steps:
   provision of a fuel at the one gas diffusion layer (70),
   provision of an oxidant at the other gas diffusion layer (70),
   where neither fuel nor oxidant are enriched with moisture.

* * * * *